US 10,627,047 B2

(12) United States Patent
Karlsson

(10) Patent No.: US 10,627,047 B2
(45) Date of Patent: Apr. 21, 2020

(54) LUBRICATION CONTROL SYSTEM

(71) Applicant: ALFA LAVAL CORPORATE AB, Lund (SE)

(72) Inventor: Per Karlsson, Hägersten (SE)

(73) Assignee: ALFA LAVAL CORPORATE AB, Lund (SE)

( * ) Notice: Subject to any disclaimer, the term of this patent is extended or adjusted under 35 U.S.C. 154(b) by 502 days.

(21) Appl. No.: 15/127,667

(22) PCT Filed: Apr. 10, 2015

(86) PCT No.: PCT/EP2015/057863
§ 371 (c)(1),
(2) Date: Sep. 20, 2016

(87) PCT Pub. No.: WO2015/155340
PCT Pub. Date: Oct. 15, 2015

(65) Prior Publication Data
US 2017/0152992 A1 Jun. 1, 2017

(30) Foreign Application Priority Data
Apr. 11, 2014 (EP) .................................. 14164411.2

(51) Int. Cl.
*F16N 29/02* (2006.01)
*F16N 13/16* (2006.01)
*F16N 27/00* (2006.01)

(52) U.S. Cl.
CPC ............. *F16N 29/02* (2013.01); *F16N 13/16* (2013.01); *F16N 27/005* (2013.01);
(Continued)

(58) Field of Classification Search
CPC .......... F16N 13/16; F16N 29/00; F16N 29/02; F16N 29/04; F16N 2250/40; F16N 2260/08
See application file for complete search history.

(56) References Cited

U.S. PATENT DOCUMENTS 4,205,708 A    6/1980  Burgbacher
4,345,668 A    8/1982  Gaunt
(Continued)

FOREIGN PATENT DOCUMENTS

CN       202660202 U    1/2013
DE   10 2011 105 647 A1  12/2012
(Continued)

OTHER PUBLICATIONS

Canadian Office Action, dated Jun. 7, 2018, for Canadian Application No. 2,945,047.

*Primary Examiner* — Minh Truong
(74) *Attorney, Agent, or Firm* — Birch, Stewart, Kolasch & Birch, LLP

(57) ABSTRACT

A lubrication control system for intermittent dosing of lubricant to one or more lubrication stations in a centrifugal separator includes a lubricant supply arrangement for supplying lubricant to at least one lubrication station. At least one pump is supplying intermittent pulsed volumes of lubricant from the lubricant supply arrangement to at least one lubricant pulse monitoring device including an elastic chamber to receive said pulsed volumes of lubricant from the pump, an outlet export valve at an outlet from the elastic chamber closing when a pulsed volume is delivered to the elastic chamber and opening to deliver the lubricant to the lubrication station, and a pressure transmitter measuring the pressure in said elastic chamber at least when a pulsed volume is received in the elastic chamber. A control computer regulating the pump controlling the pulses, closing the outlet export valve when a pulsed volume is delivered to the elastic chamber, controlling the measured pressure in the elastic chamber and opening the outlet export valve for deliverance of lubricant to the lubrication station. Also a corresponding method includes pumping intermittent pulsed volumes of lubricant to an elastic chamber, measuring the
(Continued)

Figure 1:
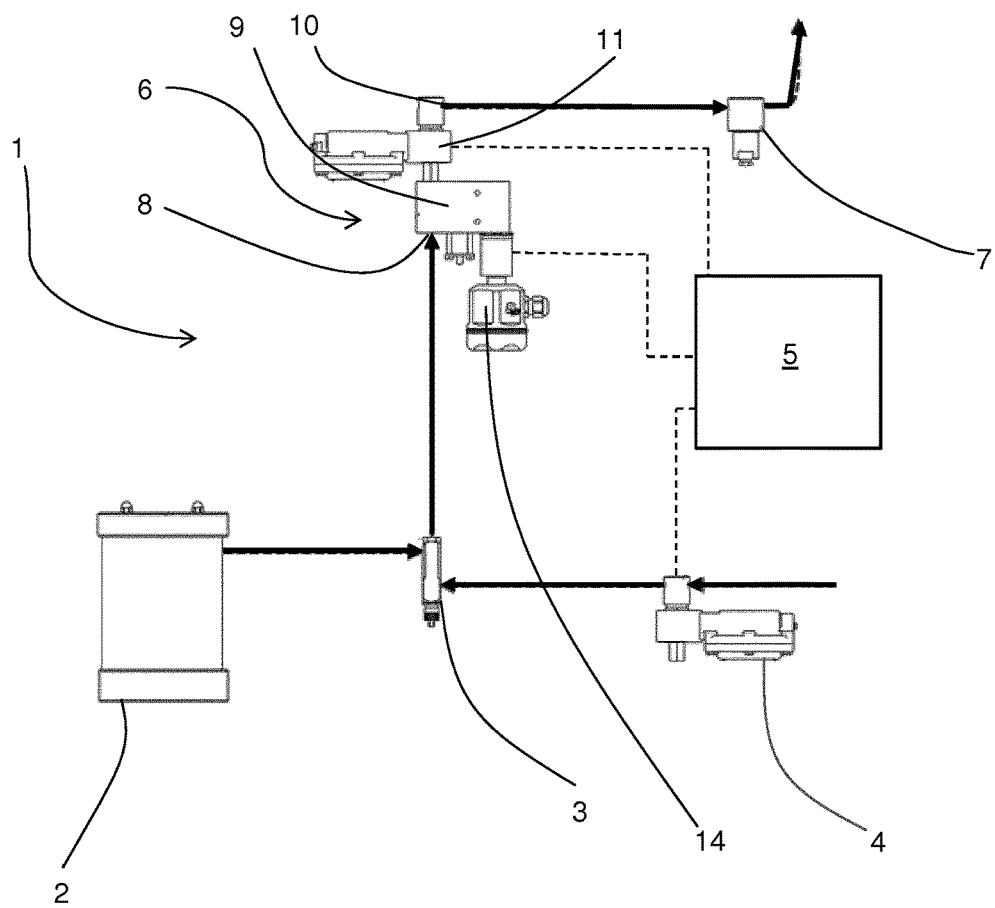

pressure in the elastic chamber when the elastic chamber has received a pulsed volume, controlling if the pressure corresponds to a required volume of lubricant, opening an outlet export valve at an outlet of said elastic chamber and emptying the elastic chamber and closing said outlet export valve to receive next pulsed volume of lubricant to the elastic chamber.

20 Claims, 2 Drawing Sheets

(52) U.S. Cl.
CPC ...... *F16N 2230/02* (2013.01); *F16N 2250/04* (2013.01); *F16N 2250/06* (2013.01); *F16N 2260/08* (2013.01); *F16N 2270/30* (2013.01); *F16N 2280/00* (2013.01)

(56) References Cited

U.S. PATENT DOCUMENTS

| | | | | |
|---|---|---|---|---|
| 4,444,292 A | * | 4/1984 | Brown | D03J 1/003 139/1 R |
| 4,668,948 A | * | 5/1987 | Merkel | B05B 12/085 340/606 |
| 4,732,190 A | * | 3/1988 | Polselli | F16K 17/24 137/460 |
| 4,852,693 A | * | 8/1989 | Nakajima | F16N 29/04 184/6.4 |
| 5,056,623 A | * | 10/1991 | Glasel | B30B 15/0011 184/6.1 |
| 5,971,107 A | | 10/1999 | Stitz et al. | |
| 2007/0137942 A1 | * | 6/2007 | Weems | F16N 5/02 184/105.2 |
| 2009/0057063 A1 | * | 3/2009 | Marek | F16N 7/38 184/7.4 |
| 2012/0132483 A1 | * | 5/2012 | Conley | F16N 7/14 184/6.4 |
| 2013/0277148 A1 | * | 10/2013 | Beck | F16N 29/02 184/6.4 |
| 2016/0290848 A1 | * | 10/2016 | Conley | F16N 31/00 |

FOREIGN PATENT DOCUMENTS

| | | |
|---|---|---|
| EP | 0 049 603 A2 | 4/1982 |
| EP | 0 368 430 A2 | 5/1990 |
| EP | 0 368 430 A3 | 6/1990 |
| EP | 0 678 152 B1 | 8/1997 |
| EP | 2 682 572 A1 | 1/2014 |

\* cited by examiner

LUBRICATION CONTROL SYSTEM

TECHNICAL FIELD

Lubrication control system for successive dosing of lubricant to one or more lubrication stations in a centrifuge separator.

Method for successive dosing of lubricant to one or more lubrication stations in a centrifugal separator.

BACKGROUND

Lubricating systems that generates and delivers a programmed sequence of pulses of lubricant to one or more lubrication stations in a machine are previously known. Such systems are in some cases monitored with pulse verification with sensors that generally work with an oval gear meter (i.e. volumetric pump), a probe that is placed in and cooled by the passing lubricant stream, or pressure loss over a nozzle. The previous known methods and arrangements have shortcomings in that they are not exact and reliable enough.

SUMMARY

It is an object of the invention to provide a lubrication system and a method of lubricating that is more reliable in delivering the lubrication pulses to the lubrication stations in a machine by means of measurements and verification of the delivery of the pulses and size of the pulsed volume.

Thus the lubrication control system mentioned above comprises
a lubricant supply arrangement for supplying lubricant to at least one lubrication station;
at least one pump supplying successive pulsed volumes of lubricant from the lubricant supply arrangement to
at least one lubricant pulse monitoring device comprising an elastic chamber to receive said pulsed volumes of lubricant from the pump, an outlet export valve at an outlet from the elastic chamber closing when a pulsed volume is delivered to the elastic chamber and opening to deliver the lubricant to the lubrication station, and a pressure transmitter measuring the pressure in said elastic chamber at least when a pulsed volume is received in the elastic chamber;
a control computer regulating the pump controlling the pulses, closing the outlet export valve when a pulsed volume is delivered to the elastic chamber, controlling the measured pressure in the chamber and if it corresponds to a required volume of lubricant, opening the outlet export valve for deliverance of lubricant to the lubrication station if the measured pressure corresponds to said required volume of lubricant.

An error signal may be delivered from the control computer if the pressure does not correspond to said required volume of lubricant.

The pressure transmitter may also measure the pressure in said elastic chamber after the outlet export valve has been ordered to open and an error signal may be delivered from the control computer if the pressure indicates that the elastic chamber is not emptied.

The pump may be a displacement pump delivering pulses of lubricant.

The elastic chamber may be an elastic bladder.
The elastic chamber may be an elastic tube.
A filter may be arranged between the lubricant pulse monitoring device and the lubrication station.

The displacement pump may be driven by compressed gas, and the control computer then is controlling a solenoid valve to deliver intermittent pulses of compressed gas to the displacement pump.

Thus the method mentioned above comprises the steps of
pumping successive pulsed volumes of lubricant to an elastic chamber;
measuring the pressure in the elastic chamber when the elastic chamber has received a pulsed volume;
controlling if the pressure corresponds to a required volume of lubricant;
opening an outlet export valve at an outlet of said elastic chamber and emptying the elastic chamber;
closing said outlet export valve to receive next pulsed volume of lubricant to the elastic chamber.

It may also comprise delivering an error signal if the pressure does not correspond to said required volume of lubricant.

It may also comprise after said outlet export valve has opened measuring the pressure in the elastic chamber and controlling that it indicates an emptied elastic chamber and delivering an error signal if the elastic chamber is not emptied.

Still other objectives, features, aspects and advantages of the invention will appear from the following detailed description as well as from the drawings.

DRAWINGS

Embodiments of the invention will now be described, by way of example, with reference to the accompanying schematic drawings, in which FIG. 1 is a schematic view of a lubrication control system according to the invention.

Figure 2:
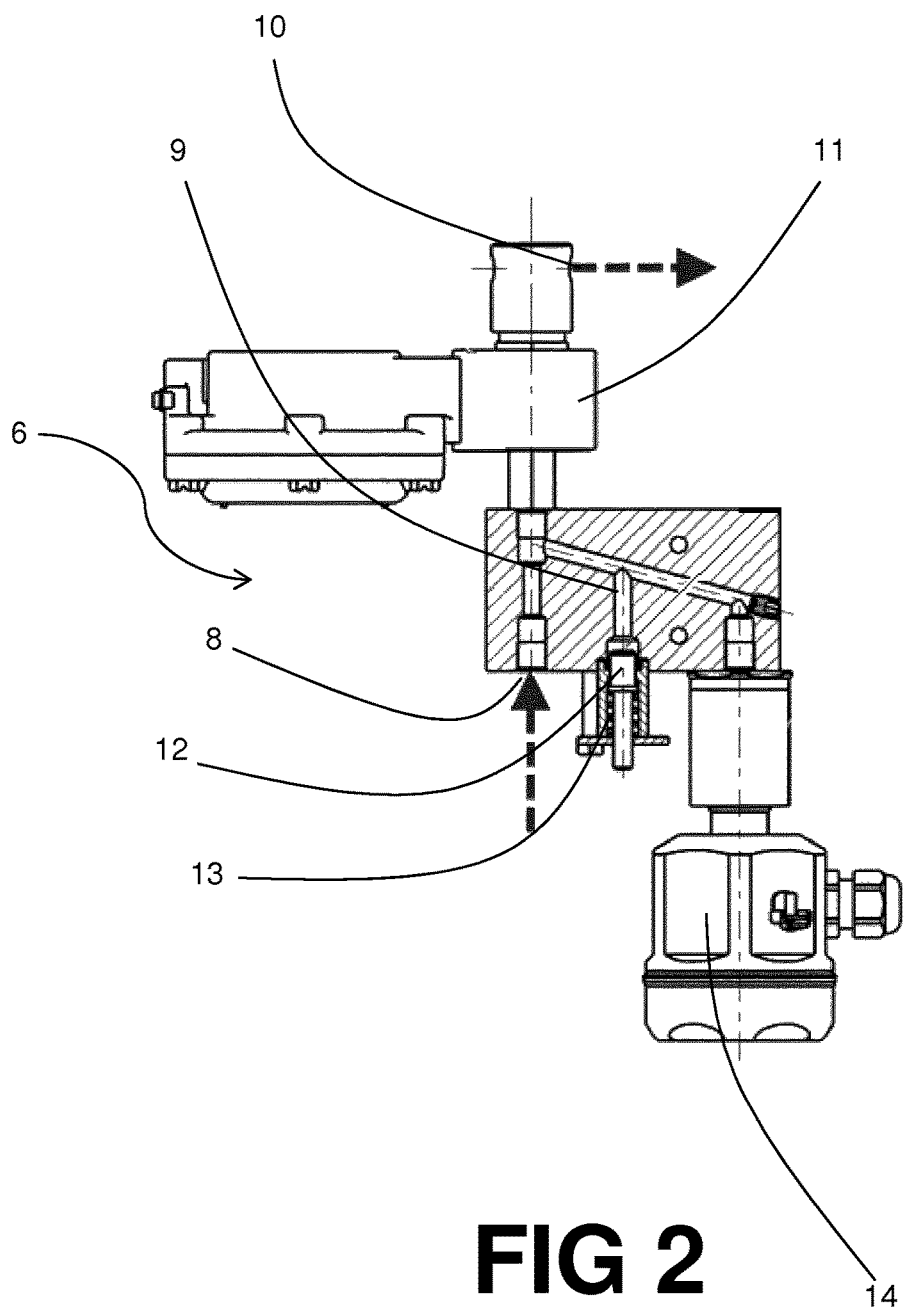

FIG. 2 is a schematic view of a part of the lubrication control system according to the invention, partly in section.

DETAILED DESCRIPTION

With reference to FIG. 1 a lubrication control system 1 for lubrication of bearings or other lubrication stations in a rotating device is illustrated schematically. The invention is suitable for centrifugal separators. The lubrication control system 1 comprises a lubricant supply arrangement in the form of a lubricant reservoir 2 which supplies a displacement pump 3 with lubricant. There may be more than one displacement pump 3 arranged in parallel supplied by the lubricant reservoir 2, however in the disclosed embodiment only one is shown. The displacement pump 3 is of a type with a fixed displacement e.g. a piston pump or any displacement pump that generates fixed volumes of the pumped fluid (in this case lubricant). The displacement pump 3 in this embodiment is driven by compressed gas (e.g. compressed air) coming from a compressed gas source (not shown) via a solenoid valve 4 but may instead be electrically or mechanically driven. The pulse intervals obtained by opening and closing the solenoid valve 4 are programmed and delivered from a control computer 5. The injector pump 3 thus creates a lubricant pulse which is led to a lubricant pulse monitoring device 6 in the form of a lubricant pulse monitoring block. The lubricant pulse monitoring device 6 is only schematically shown in FIG. 1 but is in more detail disclosed in FIG. 2 and is hereafter called monitoring block. After the monitoring device 6 a filter 7 is arranged before the lubricant reaches the lubrication station.

With reference to FIG. 2 the monitoring device 6 comprises an inlet 8 leading to an elastic chamber 9 and an outlet 10 leading therefrom. The outlet 10 is controlled by an outlet export valve 11. The elasticity of the elastic chamber 9 in the embodiment shown in FIG. 2 is achieved by a spring-loaded piston 12, with spring 13, which is striving to lessen the volume of the chamber 9. When the pulsed lubricant volume reaches the elastic chamber 9, the volume of the elastic chamber 9 adapts itself by the piston 12 is pressed to move against the power of the spring 13. A pressure transmitter 14 arranged to sense the pressure in the chamber 9, measures the pressure increase. The pressure increase corresponds to a specific amount of lubricant and if the amount is the required the lubricant pulse is delivered to a lubrication station, i.e. a bearing, by an export valve 11 arranged at and controlling the outlet 10 is opened. The outlet export valve 11 may be electrically or pneumatically operated and controlled by the control computer 5.

With reference to FIGS. 1 and 2 the function of the lubrication control system is described. At the start of the operation sequence the control computer 5 sees to that the outlet export valve 11 is closed. From the lubricant reservoir 2 the lubricant is led to the gas powered injector pump 3 (or pumps if there are more than one lubrication stations). The compressed gas solenoid valve 4 opens and activates the injector pump 3 by streaming a compressed gas pulse through the pump 3 drawing lubricant with it. The lubricant pulse charges the flexible chamber 9 and the pressure transmitter 14 measures the pressure increase. The pressure increase corresponds to an amount of lubricant and the signal from the pressure transmitter is compared to a predetermined accepted value in the control computer 5. If the measured value is accepted, the outlet export valve 11 opens and the lubricant pulse is delivered to the filter 7. The compressed gas solenoid valve 4 closes and the injector pump 3 deactivates. If the measured lubricant pressure value is not acceptable the control system 1 displays a fault message. After the outlet export valve 11 has opened, the pressure transmitter 14 again measures the pressure. If the pressure is still higher than a predetermined value it may indicate that the filter 7 is clogged. Once again the system 1 displays a fault message.

Thus the programming of the control computer 5 comprises controlling the pulses of the solenoid valve 4 for compressed gas and opening and closing of the outlet export valve 11. It also supervises the pressure in the lubricant pulse monitoring device 6. The measurements are made twice every lubrication pulse.

The pressure at the time $T_1$ (filled chamber 9) may typically be between +1 bar and +2 bar and at time $T_2$ (empty chamber 9) +/−0.5 bar.

The computer program diagnoses deviations from prescribed pressures in the pulse monitoring device 6 according to the following.

After Time $T_1$:

Pressure is too low—the pump is pumping gas (e.g. depending on lubricant tank is empty) or the pump 3 is malfunctioning (e.g. no gas pressure pulse from solenoid valve 4 to pump 3).

Pressure is too high—the filter 7 for outstreaming lubricant is clogged or the outlet export valve 11 has not opened after previous pulse.

After Time $T_2$:

Pressure is too low—the pressure transmitter does not work.

Pressure is too high—the filter 7 for outstreaming lubricant is clogged or the outlet export valve 11 has not opened after previous pulse.

Even if it is not described in the figures or in the description above in other embodiments the flexible chamber may have a different construction. For example it may be an elastic bladder-type chamber or part of an elastic tube.

The invention claimed is:

1. A lubrication control system for intermittent dosing of lubricant to one or more lubrication stations in a centrifugal separator, said lubrication control system comprising:
   a lubricant supply arrangement for supplying lubricant to at least one of the one or more lubrication stations;
   at least one pump supplying intermittent pulsed volumes of lubricant from the lubricant supply arrangement to at least one lubricant pulse monitoring device, said at least one lubricant pulse monitoring device comprising:
      an elastic chamber to receive said pulsed volumes of lubricant from the at least one pump;
      an outlet export valve at an outlet from the elastic chamber, said outlet export valve closing when a pulsed volume is delivered to the elastic chamber and opening to deliver the lubricant to the one or more lubrication stations; and
      a pressure transmitter measuring the pressure in said elastic chamber at least when a pulsed volume is received in the elastic chamber; and
   a control computer, said control computer:
   regulating the at least one pump controlling the pulses;
   closing the outlet export valve when a pulsed volume is delivered to the elastic chamber;
   measuring a pressure in the chamber, the measured pressure in the chamber corresponding to an amount of lubricant in the chamber; and
   if the measured pressure in the chamber corresponds to a required volume of lubricant, opening the outlet export valve for deliverance of lubricant to the one or more lubrication stations.

2. The lubrication control system according to claim 1, wherein an error signal is delivered from the control computer, if the measured pressure in the chamber does not correspond to said required volume of lubricant.

3. The lubrication control system according to claim 2, wherein the pressure transmitter also measures the pressure in said elastic chamber after the outlet export valve has been ordered to open and wherein an error signal is delivered from the control computer, if the measured pressure in the chamber indicates that the elastic chamber is not emptied.

4. The lubrication control system according to claim 2, wherein the at least one pump is a displacement pump delivering pulses of lubricant.

5. The lubrication control system according to claim 2, wherein the elastic chamber is an elastic bladder.

6. The lubrication control system according to claim 2, wherein the elastic chamber is an elastic tube.

7. The lubrication control system according to claim 1, wherein the pressure transmitter also measures the pressure in said elastic chamber after the outlet export valve has been ordered to open, and wherein an error signal is delivered from the control computer, if the measured pressure in the chamber indicates that the elastic chamber is not emptied.

8. The lubrication control system according to claim 7, wherein the at least one pump is a displacement pump delivering pulses of lubricant.

9. The lubrication control system according to claim 7, wherein the elastic chamber is an elastic bladder.

10. The lubrication control system according to claim 1, wherein the at least one pump is a displacement pump delivering pulses of lubricant.

11. The lubrication control system according to claim 10, wherein the displacement pump is driven by compressed gas, and the control computer is controlling a solenoid valve to deliver intermittent pulses of compressed gas to the displacement pump.

12. The lubrication control system according to claim 10, wherein the elastic chamber is an elastic bladder.

13. The lubrication control system according to claim 1, wherein the elastic chamber is an elastic bladder.

14. The lubrication control system according to claim 1, wherein the elastic chamber is an elastic tube.

15. The lubrication control system according to claim 1, wherein a filter is arranged between the lubricant pulse monitoring device and the one or more lubrication stations.

16. A method for intermittent dosing of lubricant to one or more lubrication stations in a centrifugal separator, comprising the steps of:
    pumping intermittent pulsed volumes of lubricant to an elastic chamber;
    measuring the pressure in the elastic chamber when the elastic chamber has received a pulsed volume, the measured pressure in the elastic chamber corresponding to an amount of lubricant in the chamber;
    determining if the measured pressure corresponds to a required volume of lubricant;
    opening an outlet export valve at an outlet of said elastic chamber and emptying the elastic chamber when the measured pressure corresponds to the required volume of lubricant; and
    closing said outlet export valve to receive a next pulsed volume of lubricant to the elastic chamber.

17. The method according to claim 16, further comprising the step of delivering an error signal if the pressure does not correspond to said required volume of lubricant.

18. The method according to claim 16, further comprising the steps of:
    after said outlet export valve has opened, measuring the pressure in the elastic chamber and determining whether the elastic chamber is emptied; and
    delivering an error signal if the elastic chamber is not emptied.

19. A lubrication control system for intermittent dosing of lubricant to one or more lubrication stations, comprising:
    a lubricant reservoir supplying lubricant to one or more lubrication stations;
    a pump supplying intermittent pulsed volumes of lubricant from the reservoir;
    a lubricant pulse monitoring device, the lubricant pulse monitoring device comprising:
        a housing having an inlet in fluid communication with the pump and an outlet;
        a passage extending between the inlet and outlet;
        a variable volume chamber receiving said pulsed volumes of lubricant from the pump, the variable volume chamber in fluid communication with the passage; and
        a pressure transmitter measuring the pressure in the variable volume chamber;
    an outlet export valve at the outlet of the lubricant pulse monitoring device, the outlet export valve opening to deliver the lubricant to the one or more lubrication stations; and
    a control computer, said control computer opening the outlet export valve for deliverance of lubricant to the one or more lubrication stations when pressure in the variable volume chamber corresponds to a required volume of lubricant.

20. The lubrication control system according to claim 19, wherein the variable volume chamber has a spring biased piston that moves in response to increased pressure to increase a volume of the variable volume chamber.

* * * * *